No. 631,639. Patented Aug. 22, 1899.
J. H. & G. HOWARD & G. GIBBS.
BALING PRESS.
(Application filed Apr. 19, 1898.)
(No Model.) 6 Sheets—Sheet 1.
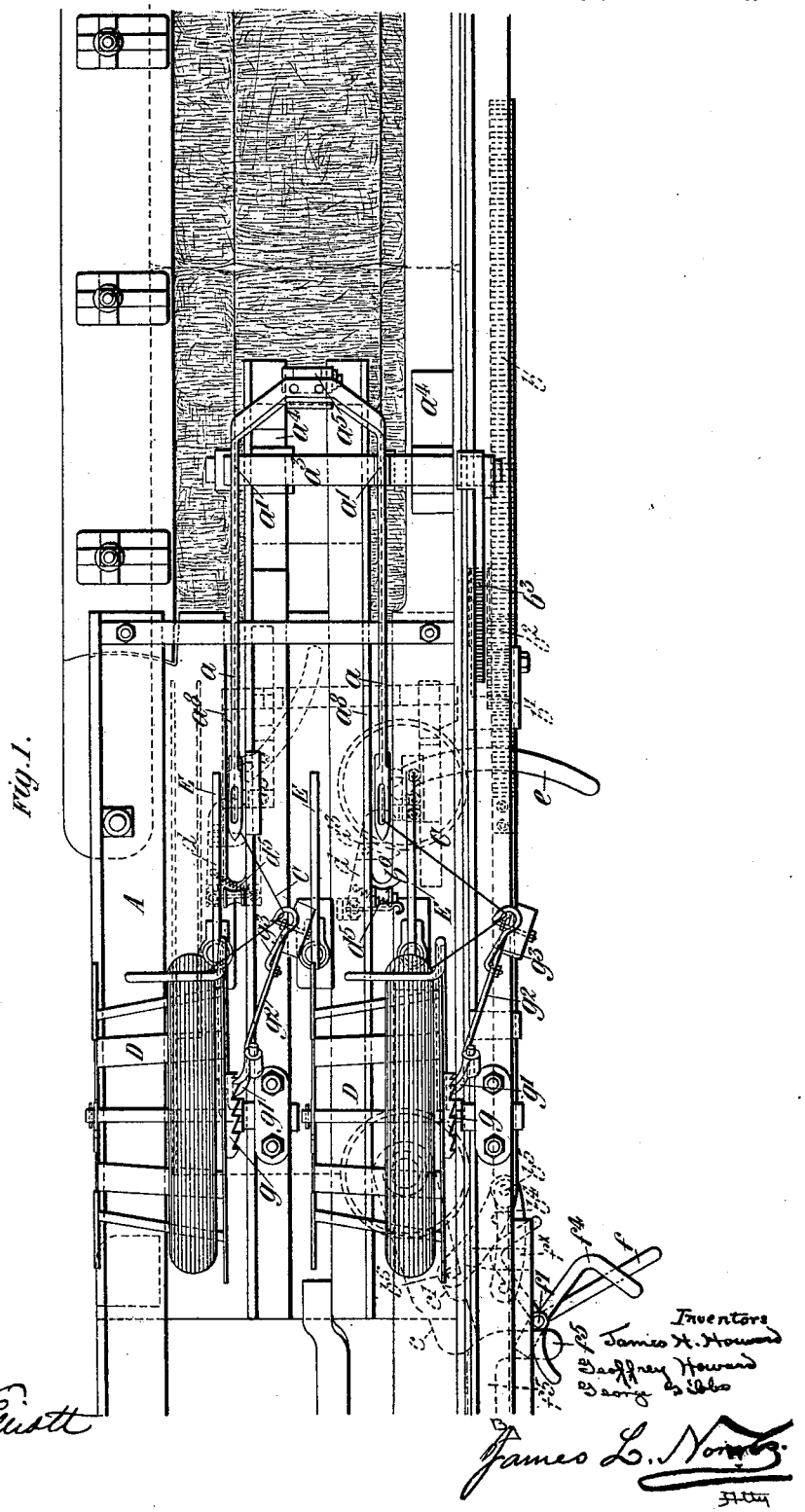

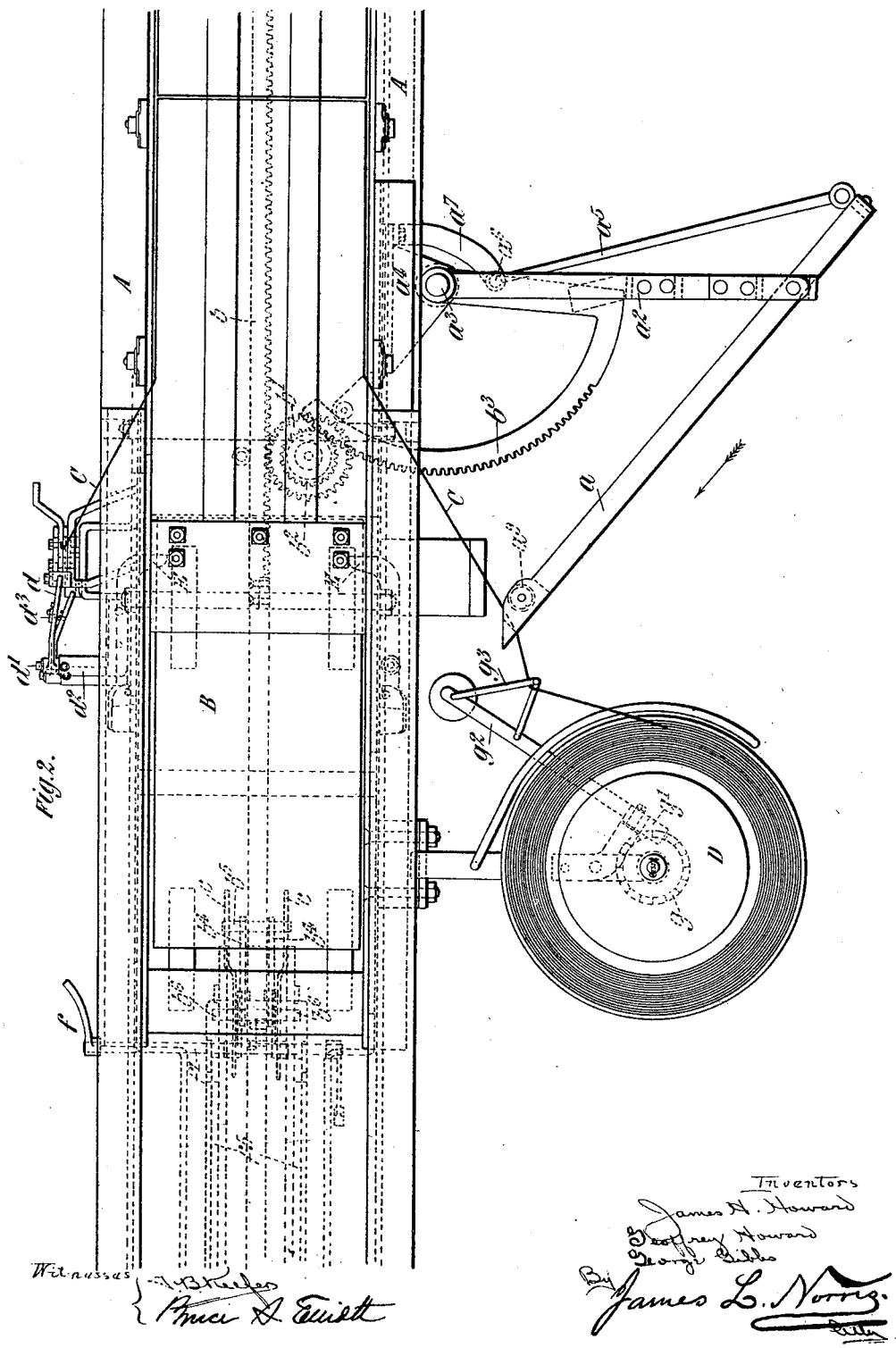

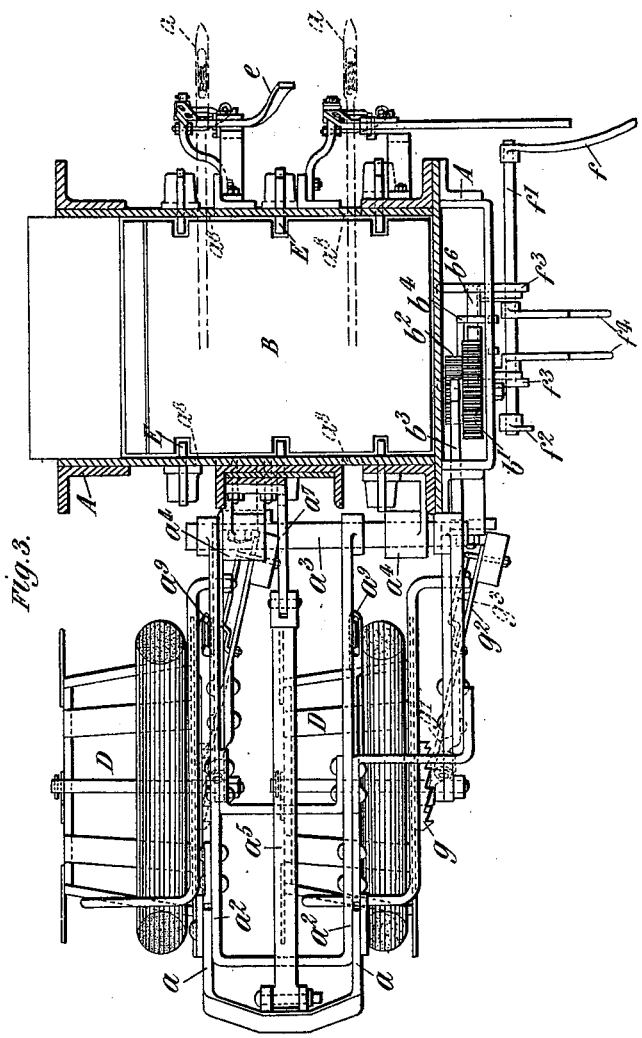

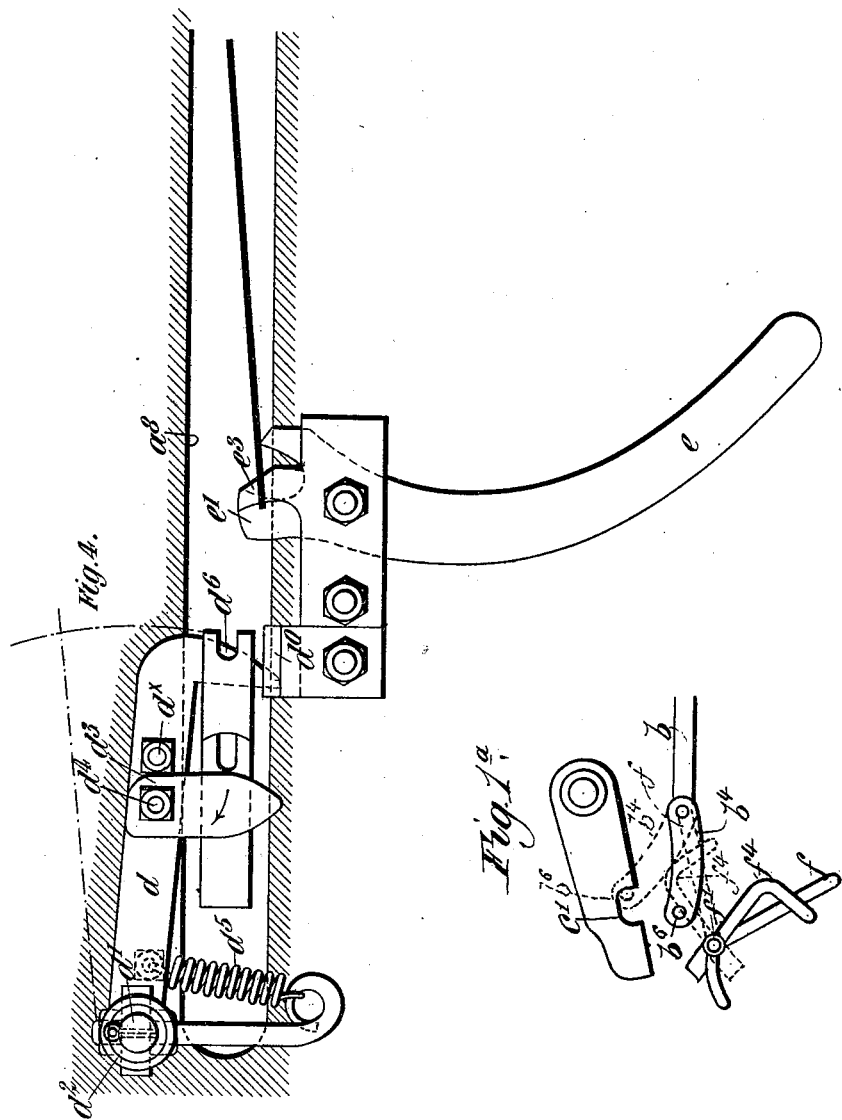

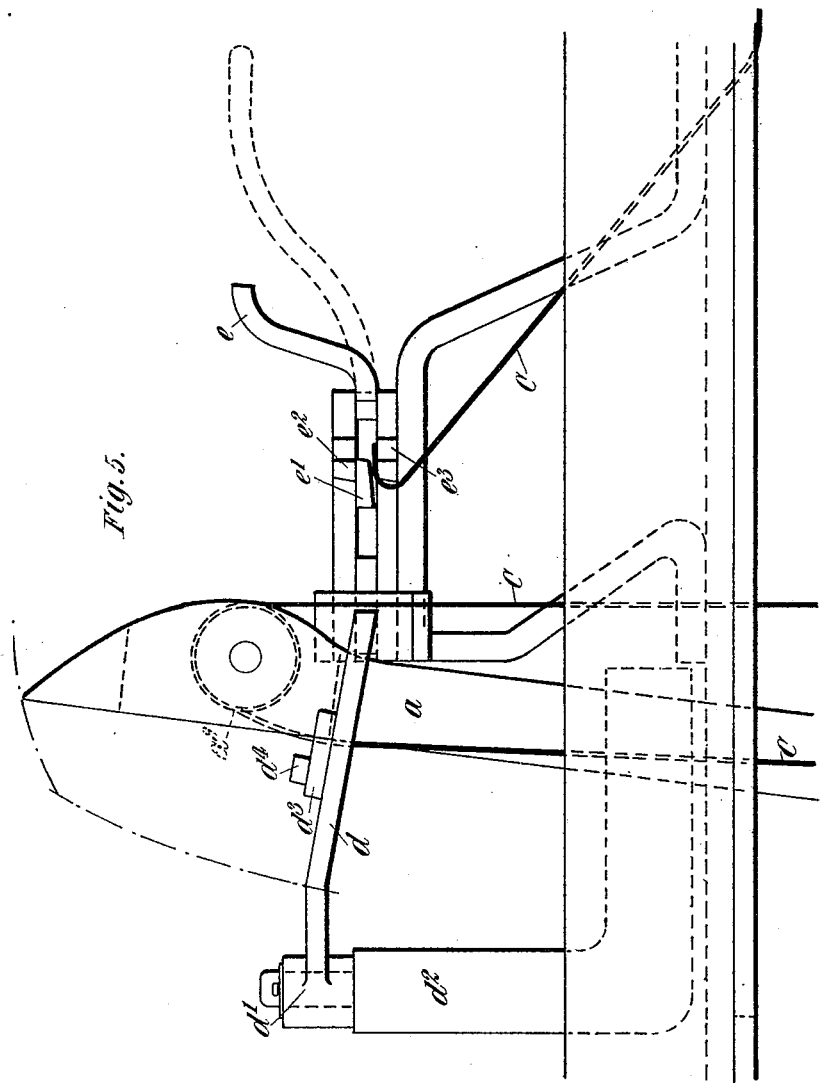

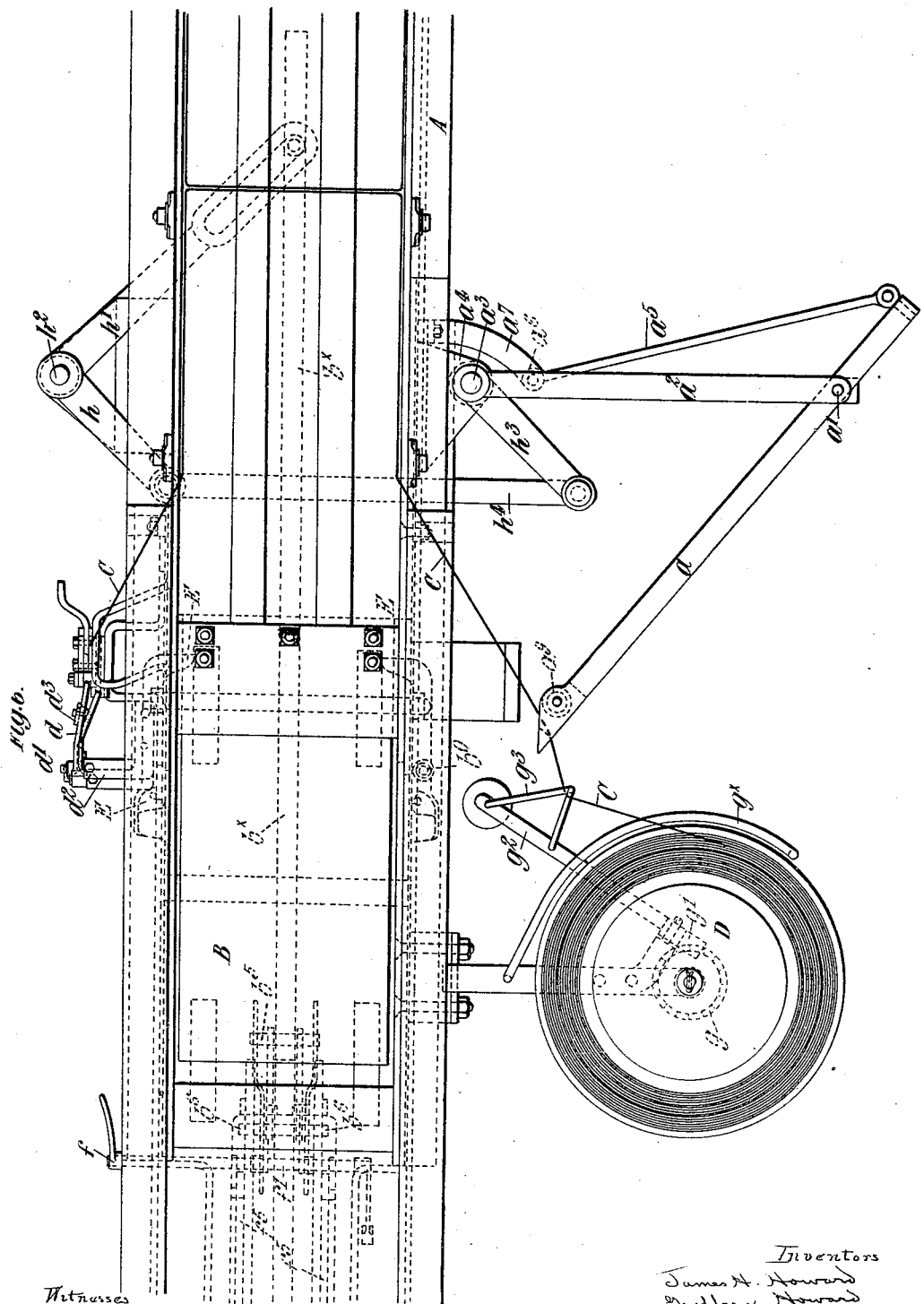

UNITED STATES PATENT OFFICE.

JAMES HAROLD HOWARD, GEOFFREY HOWARD, AND GEORGE GIBBS, OF BEDFORD, ENGLAND.

BALING-PRESS.

SPECIFICATION forming part of Letters Patent No. 631,639, dated August 22, 1899.

Application filed April 19, 1898. Serial No. 678,167. (No model.)

*To all whom it may concern:*

Be it known that we, JAMES HAROLD HOWARD, GEOFFREY HOWARD, and GEORGE GIBBS, engineers, subjects of the Queen of Great Britain, residing at the Britannia Iron Works, Bedford, in the county of Bedford, England, have invented certain new and useful Improvements in Baling-Presses, of which the following is a specification.

Our invention has reference more particularly to continuous baling-presses of the kind in which the binding-wires are drawn from reels by the bales as the latter are built up and pushed forward in the press, the said wires being passed across the rear ends of the bales by suitable tools termed "needles."

The main object of our present invention is to provide improved means for thus wiring the bales, so as to reduce the amount of labor required and avoid danger to the attendant, while at the same time rendering the working of the press more certain than it has heretofore been. To this end we provide suitable mechanically-operated needles for feeding the wires through the press behind the bale after the said wires have been drawn around the bale in the formation of the latter. These needles may be actuated by any convenient moving part of the press; but we prefer to actuate them by the plunger, as hereinafter described.

An important feature of the invention consists in the fact that the wires remain constantly threaded through the needles—that is to say, the needles do not require to be rethreaded after the formation of each bale.

A further important feature consists in providing means for connecting the needles with the plunger of the press in such a manner that they are inserted into the press only as the plunger recedes and are withdrawn therefrom in the forward movement of the plunger, thereby guarding against any risk of damage to the press by reason of contact between the plunger and said needles.

As the needles only require to be operated at intervals—that is to say, on the completion of a bale—we provide suitable mechanism under the control of the attendant for throwing them into and out of action.

In combination with the needles we provide automatic grippers for engaging with the loops of wire as they are passed across the press and for retaining them while the needles return. A suitable cutter is also provided, into which the attendant transfers the loops from the grippers. By means of this cutter the said loops can be severed, the ends required for the wiring of the next bale being retained in the cutter, while the free ends are ready for the attendant to join to the ends of the wires which have just been passed around the bale by the operation of the press, as hereinafter set forth.

In order that the invention may be clearly understood and readily carried into effect, we will now describe the same fully by reference to the accompanying drawings, in which—

Figure 1 is a side elevation of part of a press having our invention applied thereto. Fig. 1ª is a detail view, in side elevation, of a portion of the needle-operating mechanism. Fig. 2 is a plan of part of the press. Fig. 3 is a cross-section through the baling-chamber. Figs. 4 and 5 are detail views to a larger scale, showing the automatic gripper for retaining the loops while the needles perform their return movement. Fig. 6 is a plan showing a modified arrangement for operating the needles.

A is the frame of the press.

B is the plunger.

C C are the wires for binding the bales, D D are the reels on which the said wires are wound, and E E are the fingers or retainers usually employed in presses of this kind for preventing reaction or reëxpansion of the material after it has been compressed by the plunger.

Referring more particularly to Figs. 1 to 5, $a\ a$ are the mechanically-operated needles, which are mounted at $a'$ in swinging arms $a^2$, pivoted on a vertical spindle $a^3$, carried by brackets $a^4$ on the frame of the machine, these arms being connected together, as shown in Fig 3. The outer ends of the needles are also connected together, as shown in Figs. 1 and 3, and are coupled to a link $a^5$, pivoted at $a^6$ to a bracket $a^7$ on the said frame, which latter has slots $a^8$ for the needles to pass through. In their forward extremities or "eyes" the needles are provided with grooved rollers $a^9$, around which the wires extend as they are being passed through the press and which serve to diminish the friction on the said wires. The result of this arrangement for carrying the needles is that they have a compound motion imparted to them by reason of the arms $a^2$ turning on a different center to the link $a^5$. Consequently when the arms $a^2$ are operated in the manner hereinafter described to thrust the needles through the press the said needles turn on their pivots $a'$ under the action of the link $a^5$ and are rapidly brought into a position approximately at right angles to the press and maintain this position as they are thrust through the slots $a^8$ and across the press.

The operation of the arms $a^2$ is effected by a rack $b$, which is in gear, through the medium of a pair of pinions $b'$ $b^2$, with a toothed sector or segmental rack $b^3$, secured at the lower extremity of the spindle $a^3$.

The rack $b$ is mounted in suitable guides beneath the framing and carries at one end a pair of links $b^4$, pivoted on a cross-pin $b^5$, Fig. 1$^a$, and carrying at their free ends a cross-bar $b^6$. This latter cross-bar is adapted to be put into and out of engagement with a pair of plates $c$, projecting on the under side of the plunger of the press and having notches or recesses $c'$ to receive the said cross-bar. When the plunger has effected the pressing of a bale and is about to recede, the attendant throws the cross-bar $b^6$ up into the notches $c'$ by the device hereinafter mentioned, and the result is that the plunger carries the rack $b$ back with it and so operates the needles and causes them to thrust the loops of wire through the press across the rear of the bales.

$d$ $d$ are the automatic grippers for retaining the loops of wire after they have been passed through the press. These grippers are pivoted at $d'$ to brackets $d^2$, secured to the frame, and are provided with pivoted cam-like projections $d^3$, which can, however, only turn on their pivots $d^4$ in the direction of the arrow, Fig. 4, the movement in the other direction being prevented by a stop $d^\times$.

$d^5$ is a spring which tends to draw the grippers $d$ downward until they rest on brackets $d^0$.

The arrangement is such that the eye of each needle in passing out through the press comes under its respective gripper between the pivot thereof and the projection $d^3$. Owing to the compound nature of the movement of the needle, the said eye is at the same time displaced laterally, as indicated by the dotted lines in Fig. 5, and strikes the projection $d^3$ in the direction in which the latter is unable to move. The consequence is that the said projection rides up onto the needle after the manner of a cam, so lifting the gripper into its highest position. Immediately, however, that the needle has passed from beneath the projection $d^3$ the gripper falls and its nose $d^6$ inserts itself into the wire loop. (See Figs. 4 and 5.) In its return movement, however, the needle strikes the projection $d^3$ in the opposite direction—i. e., that in which it is free to turn—the result being that the said projection simply swings upward on its pivot $d^4$ without raising the gripper, and consequently the nose $d^6$ remains in engagement with the loop all the time the needle is retiring and until the attendant disengages it.

The cutting device, into which the wire is placed after being disengaged from the gripper $d$, comprises a handle $e$, carrying a cutter $e'$, working between a pair of stationary jaws $e^2$ $e^3$. One edge of the cutter $e'$ and the adjacent edge of the jaw $e^3$ are rounded off, while the other edge of the cutter and the edge of the jaw $e^2$ are sharp, so that while the latter edges sever the wire the former serve to nip and retain that leg of the loop which is still left in the eye of the needle and is connected to the reel. It should be mentioned with regard to Fig. 5 that the end of the wire shown as held in the cutter was passed through the press by the previous operation of the needle and that it forms in reality a continuation of the loop of wire shown in the needle, the intermediate portion being stretched around the bale. It will be understood, therefore, that all the wires shown in Fig. 5 form one continuous length which is still in connection with the reel. Thus the needles $a$ never become disconnected from the wires, but simply after each cutting operation retire along those legs of the loops which are held in the cutter and which still remain connected with the reels.

The device whereby the operation of the needles is controlled, so that they can be thrown into action at will, comprises a handle $f$, carried by an axle $f'$, which has at its opposite extremity an arm $f^2$ to prevent its being turned in the wrong direction and is mounted in brackets $f^3$. On the axle $f'$ is a pair of cranked arms $f^4$, adapted when the axle is turned to engage with the aforesaid links $b^4$ and to raise them so as to throw the cross-bar $b^6$ into the recesses $c'$ of the projecting plates $c'$ on the plunger.

The force with which the edges of the recesses $c'$ bear against the cross-bar $b^6$ when the plunger is moving prevents the said bar dropping out of engagement; but in order to positively prevent this suitable rails or guides $f^5$ (see Fig. 1) are provided, onto which the ends of the bar $b^6$ pass at the commencement of the travel and which effectually keep the bar in the recess until the plunger returns it to the end of the rail $f^5$.

In order to prevent the reels D revolving at times when the wires are not being drawn off them, we employ a ratchet $g$, Figs. 1, 2, and 3, and pawl $g'$ in connection with each reel, the pawl having an extension or tail $g^2$, carrying a bent wire rod $g^3$, through which the wire from the reel passes, the arrangement being such that the pawl engages with the teeth of the ratchet $g$ and prevents the reels turning as long as the wire C is slack and is hanging, as in Fig. 1; but immediately the wire is tightened up, which occurs when it is being drawn into the press, the tail $g^2$ is raised, so depressing the pawl and setting the reel free.

$g^\times$ $g^\times$ are bent rods, and $g^0$ $g^0$ are rollers which serve, respectively, as guides for the wire and to prevent friction of the same against the edges of the slots $a^8$.

The action of the press is as follows: The wires C are first passed through the eyes of the needles and across the press, and their ends are secured in the cutting device between the rounded edges of the cutter $e'$ and jaw $e^3$. The material is then fed into the press between the wire and the plunger in successive charges, and the plunger is operated to compress the said material and gradually build up the bale, reaction of the compressed material being prevented by the spring-fingers or retainers E. During these operations, which are of the ordinary kind, the wires originally stretched straight across the press are gradually forced laterally into a loop, which eventually extends from the cutting device to the eye of the needle around three sides of the bale, as shown in Fig. 2. The next step is to complete the encircling of the bale by the wires, which is done by means of the needles. For this purpose just as the plunger is commencing its backward stroke the handle $f$ is operated to throw the cross-bar $b^6$, connected to the rack $b$, into engagement with the notched plates $c$ on the plunger, as hereinbefore described. Consequently as the plunger recedes the rack $b$ is drawn back with it, and through the medium of the toothed gearing $b'$ $b^2$ $b^3$ the arms $a^2$ are caused to turn on their pivots and the needles are thrust through the slots $a^8$ in the press and project out on the other side thereof and the automatic grippers $d$ insert themselves, as already explained, into the loops of wire. Concurrently with this the plunger, which has completed its rearward movement, commences to move forward and the rack $b$ reverses the motion of the needles, causing them to swing back toward the position shown in Fig. 2, the loops of wire being, however, retained on the noses $d^6$ of the grippers, which then rest on the brackets $d^0$. The plunger completes its forward movement, but as it commences to move rearwardly again the edges of the recesses $c'$ in the plates $c$ during the change of motion momentarily cease to press on the bar $b^6$. The latter therefore, being now in the raised position shown in Fig. 1 and being unsupported by the rails $f^5$, immediately falls out of the said recesses and the rack $b$ is automatically disconnected from the plunger. To prevent the rack $b$ from being driven too far forward, a pair of stops $f^\times$ are provided, against which the ends of the bar $b^6$ engage if the said bar be carried too far by the plunger. Meanwhile the attendant opens the cutter and releases the end of the wire that had previously been in it and transfers to it the loop left on the gripper $d$, which loop is then cut off, one end—i. e., that connected to the reel—being held between the rounded edges of the cutter, while the other, which is connected to the bale, is twisted around the wire which has just been released from the cutter. The apparatus is now ready for the formation of another bale, which proceeds in a precisely similar manner.

Referring now to Fig. 6, this shows a modified arrangement we may sometimes employ for operating the arms $a^2$ and the needles instead of the gearing $b'$ $b^2$ $b^3$ previously described. In this case $h$ $h'$ are the two arms of a bell-crank lever pivoted at $h^2$. The arm $h'$ has a pin-and-slot connection with a rod $b^\times$, taking the place of the rack $b$ in the former arrangement, while the arm $h$ is connected with a corresponding arm $h^3$ on the spindle $a^3$ of the arm $a^2$ by means of a link $h^4$, extending beneath the bottom of the press. The operation of the parts is substantially the same as that of the previous arrangement.

What we claim is—

1. In a baling-press, the combination of mechanically-operated needles, swinging arms in which said needles are mounted, links connected with said needles and pivoted eccentrically with regard to said arms for imparting a compound motion to the needles, means for actuating said arms from a moving part of the press, reels for supplying continuous lengths of wire to said needles, automatic grippers for retaining said lengths of wire as carried through the press by the needles, and mechanism for cutting the loops of wire retained by said grippers and for holding one of the legs of each loop after the same is cut, substantially as described.

2. In a baling-press, the combination of a plunger, mechanically-operated needles, swinging arms in which said needles are mounted, means for actuating said arms from the plunger, links connected with said needles and pivoted eccentrically with regard to said arms for imparting a compound motion to the needles, reels for supplying continuous lengths of wire to the needles, grippers for retaining said lengths of wire as carried through the press by the needles, and mechanism for cutting said wire and for holding one of the legs of each loop after the same is cut, substantially as described.

3. In a baling-press, the combination of mechanically-operated needles, swinging arms carrying said needles, a spindle on which said arms are pivoted, eccentrically-pivoted links connected with said needles to impart a compound motion thereto, a toothed sector secured to the spindle of the swinging arms, a rack, gearing for connecting said rack and sector, a plunger, and means for connecting said rack and plunger to operate the swinging arms and needles, substantially as described.

4. In a baling-press, the combination of a plunger, swinging arms actuated from said plunger, needles mounted in said swinging arms, links connected with said needles and pivoted eccentrically with regard to said swinging arms, for imparting a compound motion to the needles, reels for supplying continuous lengths of wire to said needles, automatic grippers for retaining said lengths of wire after they are carried through the press by the needles, mechanism controlled from the wires to start and stop the reels, and mechanism for cutting the loops of wire retained by the grippers and for holding one of the legs of each loop after the same is cut, substantially as described.

5. In a baling-press the combination of a reciprocating plunger, mechanically-operated needles, a rack operated by said plunger and in gear with said needles, a cross-bar carried by links on the end of said rack, projecting notched plates on said rack, and means for throwing said cross-bar into and out of engagement with said plates substantially as described.

In testimony whereof we have hereunto set our hands, in presence of two subscribing witnesses, this 29th day of March, 1898.

JAMES HAROLD HOWARD.
GEOFFREY HOWARD.
GEORGE GIBBS.

Witnesses:
CHARLES JAMES MARSHALL,
HENRY WM. GIBBS.